(12) United States Patent
Akiyama

(10) Patent No.: US 10,904,498 B2
(45) Date of Patent: Jan. 26, 2021

(54) LIGHT SOURCE APPARATUS, PROJECTOR, AND LIGHT SOURCE MODULE

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/827,828

(22) Filed: Mar. 24, 2020

(65) Prior Publication Data
US 2020/0314397 A1    Oct. 1, 2020

(30) Foreign Application Priority Data
Mar. 26, 2019   (JP) .................................. 2019-058863

(51) Int. Cl.
*H04N 9/31* (2006.01)
*G02F 1/13* (2006.01)

(52) U.S. Cl.
CPC ......... *H04N 9/3167* (2013.01); *G02F 1/1326* (2013.01); *H04N 9/3105* (2013.01)

(58) Field of Classification Search
CPC ... H04N 9/3167; H04N 9/3105; G02F 1/1326
See application file for complete search history.

(56) References Cited

U.S. PATENT DOCUMENTS

| 5,161,042 | A | 11/1992 | Hamada |
| 9,918,055 | B2 * | 3/2018 | Sakata ................. G02B 27/283 |
| 2013/0027670 | A1 | 1/2013 | Akiyama et al. |
| 2017/0329212 | A1 * | 11/2017 | Akiyama ............. G03B 21/204 |
| 2018/0131917 | A1 * | 5/2018 | Sato ....................... G03B 21/14 |

FOREIGN PATENT DOCUMENTS

| JP | H04-60538 A | 2/1992 |
| JP | 2013-029585 A | 2/2013 |
| JP | 2013-054091 A | 3/2013 |

* cited by examiner

*Primary Examiner* — Michael E Teitelbaum
(74) *Attorney, Agent, or Firm* — Oliff PLC

(57) ABSTRACT

A light source apparatus includes a light source, a first polarization separator that transmits a first polarization component of first light in the first direction and reflects a second polarization component of the first light in a second direction, a second polarization separator that reflects the first polarization component of the first light in the second direction, a first reflector that reflects the second polarization component of the first light, a first retarder between the first polarization separator and the first reflector, a wavelength converter that converts the first light into second light and outputs the second light, a first color separator, a second retarder, a second color separator, and a third retarder.

20 Claims, 8 Drawing Sheets

LIGHT SOURCE APPARATUS, PROJECTOR, AND LIGHT SOURCE MODULE

The present application is based on, and claims priority from JP Application Serial Number 2019-058863, filed Mar. 26, 2019, the disclosure of which is hereby incorporated by reference herein in its entirety.

BACKGROUND

1. Technical Field

The present disclosure relates to a light source apparatus, a projector, and a light source module.

2. Related Art

There has been a known projector of related art that modulates light outputted from a light source to form an image according to image information and projects the formed image. As a projector of this type, there is a known single-panel projector that spatially separates light outputted from a white-light light source into a plurality of color light fluxes and causes the separated color light fluxes to be incident on corresponding sub-pixels for color display (see JP-A-4-60538, for example).

In the projector described in JP-A-4-60538, a red light reflecting dichroic mirror, a green light reflecting dichroic mirror, and a blue light reflecting dichroic mirror are so disposed along the optical axis of the light outputted from the light source and incident on the dichroic mirrors as to be non-parallel to one another. The light outputted from the light source is therefore separated into red light, green light, and blue light that slightly differ from one another in terms of traveling direction in the same plane. The separated red light, green light, and blue light are collected by microlenses provided on the light incident side of light modulators, and the spatially separate, collected red light, green light, and blue light are incident on red sub-pixels, green sub-pixels, and blue sub-pixels of the light modulators, respectively.

In the projector described in JP-A-4-60538, a light source lamp, such as a halogen lamp and a xenon lamp, is employed as the white-light light source, and liquid crystal display devices are employed as the light modulators. The light outputted from the light source lamp is non-polarized light, and in the case where liquid crystal display devices are used as the light modulators, the light incident on each of the liquid crystal display devices needs to be linearly polarized light of one type.

To this end, it is conceivable to provide the following components between the white-light light source and the liquid crystal display devices: a pair of multi-lenses that divide light incident thereon into a plurality of sub-light fluxes; and a polarization converter that aligns the polarization directions of the plurality of sub-light fluxes incident thereon with one another. The polarization converter may, for example, include a plurality of polarization separation layers and a plurality of reflection layers alternately arranged along a direction perpendicular to the direction in which the light is incident on the polarization converter and a phase retardation layer provided in the optical path of the light having passed through each of the polarization separation layers or the optical path of the light reflected off each of the reflection layers.

To reduce the size of the projector described in JP-A-4-60538 to satisfy a request for size reduction in recent years, there is a difficulty in manufacturing a polarization converter having a small interval between the polarization separation layers and the reflection layers. There is therefore a difficulty in reducing the size of a light source apparatus including the polarization converter and hence the size of the projector including the light source apparatus.

A light source apparatus capable of outputting a plurality of color light fluxes having polarization directions aligned with one another has been desired in view of the problems described above.

SUMMARY

A light source apparatus according to a first aspect of the present disclosure includes a light source section that outputs first light, a first polarization separator that receives the first light outputted from the light source section and incident on the first polarization separator along a first direction, transmits a first polarization component of the first light in the first direction, and reflects a second polarization component of the first light in a second direction perpendicular to the first direction, a second polarization separator that is located in a position shifted in the first direction from the first polarization separator and reflects the first polarization component of the first light incident on the second polarization separator in the first direction in such a way that the reflected light travels in the second direction, a first reflector that is located in a position shifted from the first polarization separator in the second direction and reflects the first light incident on the first reflector in such a way that the reflected light travels in a third direction opposite the second direction, a first retarder that is located between the first polarization separator and the first reflector in the second direction and converts the polarization components of the first light, a wavelength converter that is located in a position shifted from the second polarization separator in the second direction, converts the first polarization component of the first light incident in the second direction on the wavelength converter in terms of wavelength into non-polarized second light, and outputs the non-polarized second light in the third direction, a first color separator that is located in a position shifted from the first polarization separator in the third direction and separates light incident from the first polarization separator in the third direction into third light before converted and fourth light, a second retarder that is a half-wave plate located in an optical path of the third light before converted and separated by the first color separator, converts a polarization direction of the third light before converted, and outputs the converted light as the third light, a third retarder that is a half-wave plate which is located in a position shifted in the third direction from the second polarization separator and on which the second light having passed through the second polarization separator is incident, and a second color separator that is located in a position shifted in the third direction from the third retarder and separates the second light incident from the third retarder into fifth light and sixth light. The second polarization separator receives the second light incident in the third direction on the second polarization separator, transmits a first polarization component of the second light in the third direction to cause the first polarization component of the second light to be incident on the third retarder, and reflects a second polarization component of the second light in a fourth direction opposite the first direction. The first polarization separator transmits the first polarization component of the first light incident in the third direction on the first polarization separator in such a way that the transmitted light travels in the third direction to cause the first polarization component of the first light to be incident on the first color separator and reflects the second polarization component of the second light incident in the fourth direction on the first polarization separator in such a way that the reflected light travels in the third direction to cause the second polarization component of the second light to be incident on the first polarization separator. The first color separator outputs the first polarization component of the first light incident from the first polarization separator on the first color separator as the third light before converted to the second retarder and outputs the second polarization component of the second light incident from the first polarization separator on the first color separator as the fourth light. The second color separator outputs a first color component contained in the second polarization component of the second light incident from the third retarder on the second color separator as the fifth light and outputs a second color component contained in the second polarization component of the second light as the sixth light.

In the first aspect described above, the light source section may include a light source and a fourth retarder that converts part of the second polarization component of the first light outputted from the light source into the first polarization component of the first light.

In the first aspect described above, the light source section may include a rotator that rotates the fourth retarder around an axis of rotation along the first direction.

In the first aspect described above, the light source apparatus may further include a second reflector that is located in an optical path of the fourth light and reflects part of the fourth light incident on the second reflector toward the first color separator.

In the first aspect described above, the light source apparatus may further include a third color separator that is located in an optical path of the fourth light, receives the fourth light incident on the third color separator, transmits light that belongs to substantially a same wavelength band to which the fifth light belongs out of the incident fourth light, and reflects light that belongs to substantially a same wavelength band to which the sixth light belongs out of the incident fourth light toward the first color separator.

In the first aspect described above, the light source apparatus may further include a first light collector that is located between the first retarder and the first reflector and collects the first light incident from the first retarder on the first light collector into a spot at the first reflector.

In the first aspect described above, the light source apparatus may further include a second light collector that is located between the second polarization separator and the wavelength converter and collects the first light incident from the second polarization separator on the second light collector into a spot at the wavelength converter.

A projector according to a second aspect of the present disclosure includes the light source apparatus described above, a light modulator that modulates light outputted from the light source apparatus, and a projection optical apparatus that projects the light modulated by the light modulator.

In the second aspect described above, the projector may further include a homogenizer located between the light source apparatus and the light modulator, and the homogenizer may include two multi-lenses that divide the light incident from the light source apparatus into a plurality of sub-light fluxes and a superimposing lens that superimposes the plurality of sub-light fluxes incident on the superimposing lens from the two multi-lenses on one another at the light modulator.

In the second aspect described above, the light modulator may include one liquid crystal panel having a plurality of pixels and a microlens array located on a light incident side of the liquid crystal panel and including a plurality of microlenses corresponding to the plurality of pixels. The plurality of pixels may each have a first sub-pixel, a second sub-pixel, a third sub-pixel, and a fourth sub-pixel. The plurality of microlenses may each cause the third light to be incident on the first sub-pixel, the fourth light to be incident on the second sub-pixel, the fifth light to be incident on the third sub-pixel, and the sixth light to be incident on the fourth sub-pixel.

A light source module according to a third aspect of the present disclosure is a light source module that is used in a light source apparatus and outputs a plurality of color light fluxes, the light source module including a light source section that outputs first light, a first polarization separator that receives the first light outputted from the light source section and incident on the first polarization separator along a first direction, transmits a first polarization component of the first light in the first direction, and reflects a second polarization component of the first light in a second direction perpendicular to the first direction, a second polarization separator that is located in a position shifted in the first direction from the first polarization separator and reflects the first polarization component of the first light incident in the first direction on the second polarization separator in such a way that the reflected light travels in the second direction, a first reflector located in a position shifted from the first polarization separator in the second direction and reflects the first light incident on the first reflector in such a way that the reflected light travels in a third direction opposite the second direction, a first retarder that is located between the first polarization separator and the first reflector in the second direction and converts the polarization components of the first light, and a wavelength converter that is located in a position shifted from the second polarization separator in the second direction, converts the first polarization component of the first light incident on the wavelength converter in terms of wavelength into non-polarized second light, and outputs the non-polarized second light in the third direction. The second polarization separator receives the second light incident in the third direction on the second polarization separator, transmits a first polarization component of the second light in the third direction, and reflects a second polarization component of the second light in a fourth direction opposite the first direction, and the first polarization separator transmits the first polarization component of the first light incident in the third direction on the first polarization separator in such a way that the transmitted light travels in the third direction and reflects the second polarization component of the second light incident in the fourth direction on the first polarization separator in such a way that the reflected light travels in the third direction.

DESCRIPTION OF EXEMPLARY EMBODIMENTS

First Embodiment

A first embodiment of the present disclosure will be described below with reference to the drawings.
Schematic Configuration of Projector FIG. 1 is a plan view diagrammatically showing the internal configuration of a projector 1 according to the present embodiment.

The projector 1 according to the present embodiment modulates light outputted from a light source apparatus 2 to form an image according to image information, enlarges the formed image, and projects the enlarged image on a projection receiving surface, such as a screen. In detail, the projector 1 is what is called a single-panel projector, in which one light modulator 6 including one liquid crystal panel 61 modulates the light outputted from the light source apparatus 2 to form an image and the formed image is projected.

Figure 1:
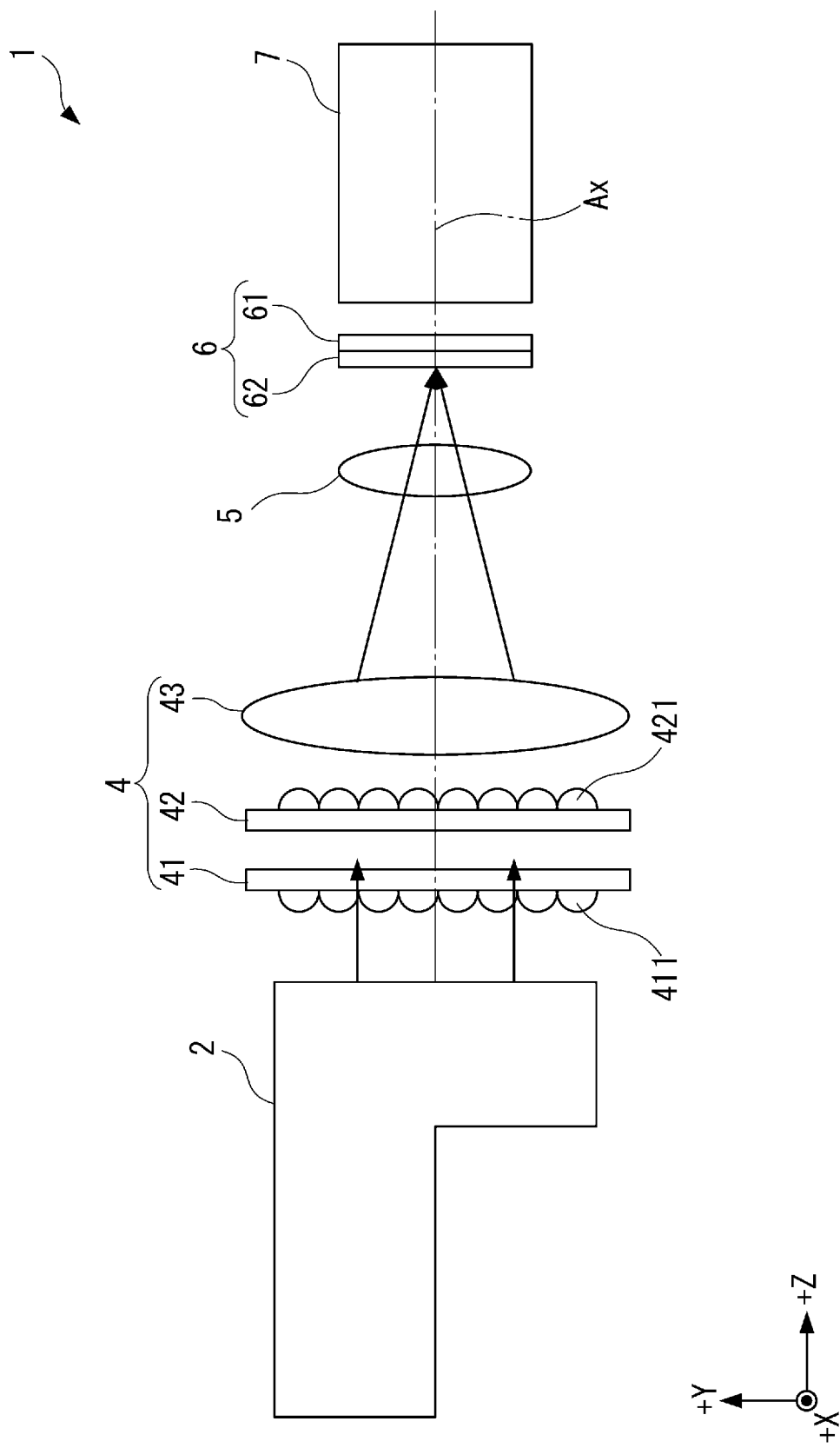
FIG. 1 is a diagrammatic view showing the configuration of a projector in a first embodiment.

The projector 1 includes the light source apparatus 2, a homogenizer 4, a field lens 5, the light modulator 6, and a projection optical apparatus 7, as shown in FIG. 1, which are disposed in predetermined positions along an illumination optical axis Ax set in the projector 1.

The field lens 5 is disposed between the homogenizer 4 and the light modulator 6. The field lens 5 converts the light incident from the light source apparatus 2 on the light modulator 6 via the homogenizer 4 into telecentric light.

The projection optical apparatus 7 projects the light modulated by the light modulator 6, that is, image forming light.

Figure 2:
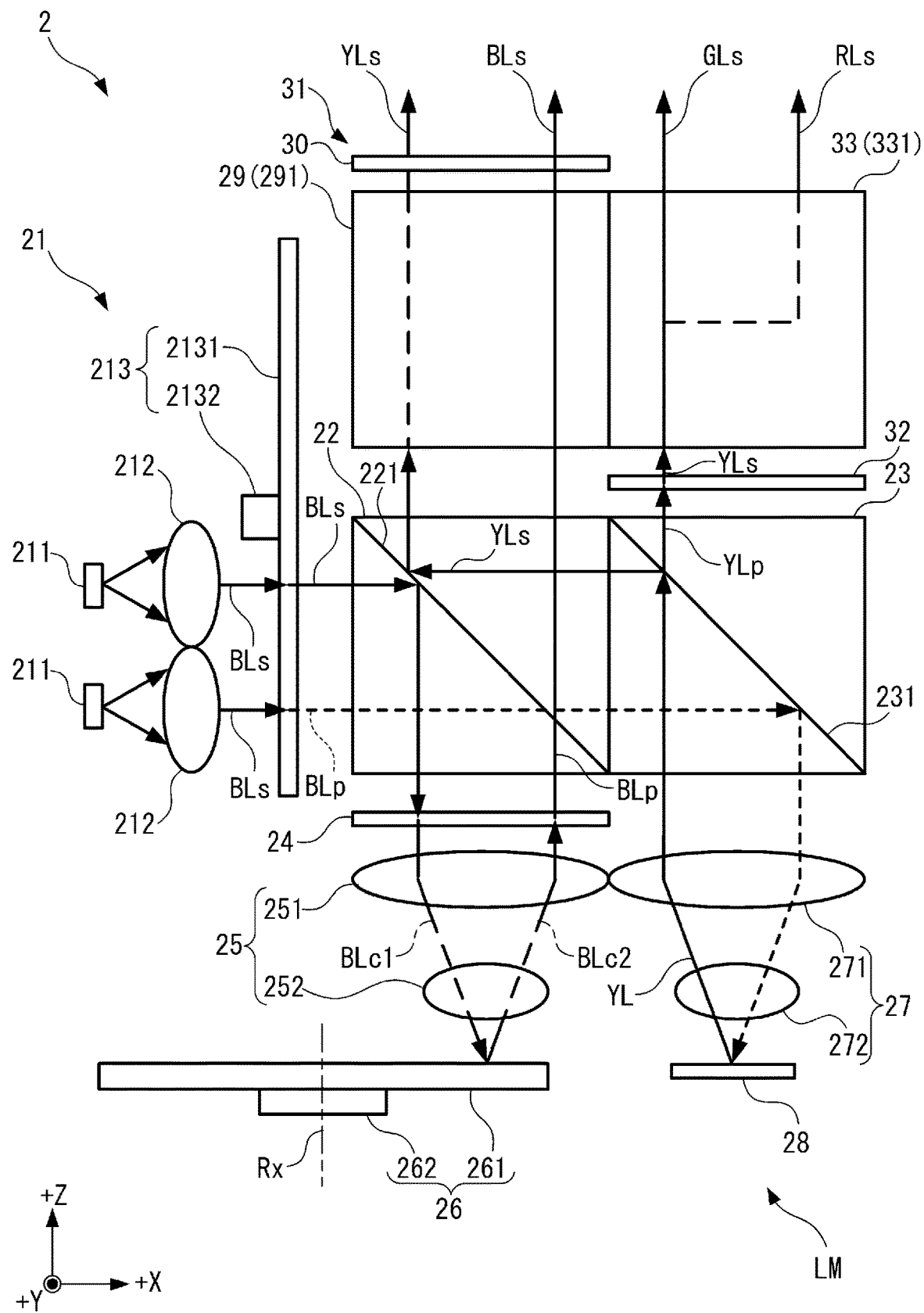
FIG. 2 is a diagrammatic view showing the configuration of a light source apparatus in the first embodiment.

In the following description, the direction in which the light outputted from the light source apparatus 2 travels along the illumination optical axis Ax is called a direction +Z, and the two directions perpendicular to the direction +Z and perpendicular to each other are called directions +X and +Y. Out of the three directions, the direction +Y is called an upward direction in the projector 1. The direction +X is called a rightward direction in a case where a target object on which the light is incident along the direction +Z is so viewed that the direction +Y is oriented upward. Although not shown, the direction opposite the direction +X is called a direction −X, the direction opposite the direction +Y is called a direction −Y, and the direction opposite the direction +Z is called a direction −Z.
Configuration of Light Source Apparatus FIG. 2 is a diagrammatic view showing the configuration of the light source apparatus 2. In other words, FIG. 2 is a plan view of the light source apparatus 2 viewed in the direction +Y.

The light source apparatus 2 outputs illumination light, with which the light modulator 6 is illuminated, in the direction +Z along the illumination optical axis Ax. The illumination light outputted by the light source apparatus 2 is linearly polarized light having an aligned polarization direction and is formed of a plurality of spatially separated color light fluxes. In the present embodiment, the illumination light outputted by the light source apparatus 2 is formed of s-polarized color light fluxes, blue light BLs, yellow light YLs, green light GLs, and red light RLs, which are spatially separate from one another, as shown in FIG. 2.

The light source apparatus 2 includes a light source section 21, a first polarization separator 22, a second polarization separator 23, a first retarder 24, a first light collector 25, a first reflector 26, a second light collector 27, a wavelength converter 28, a first color separator 29, a second retarder 30, a second reflector 31, a third retarder 32, and a second color separator 33.

Out of the components described above, the light source section 21, the first polarization separator 22, the second polarization separator 23, the first retarder 24, the first reflector 26, and the wavelength converter 28 form a light source module LM. That is, the light source module LM is employed in the light source apparatus 2.

In the present embodiment, p-polarized light corresponds to a first polarization component, and s-polarized light corresponds to a second polarization component.
Configuration of Light Source Section The light source section 21 outputs first light to be incident on the first polarization separator 22 along the direction +X, which is a first direction. The light source section 21 includes light sources 211, collimator lenses 212, and a rotary retardation apparatus 213.

The light sources 211 are each a solid-state light source that outputs blue light. In detail, the light sources 211 are each a semiconductor laser that outputs s-polarized blue light BLs. The blue light BLs is laser light having a peak wavelength ranging, for example, from 450 to 460 nm.

The collimator lenses 212 each parallelize the light outputted from the corresponding light source 211.

The rotary phase retardation apparatus 213 includes a retarder 2131, which serves as a fourth retarder, and a rotator 2132, which rotates the retarder 2131 around an axis of rotation parallel to the direction +X.

The retarder 2131 is a half-wave plate or a quarter-wave plate. Part of the s-polarized blue light BLs incident on the retarder 2131 is converted by the retarder 2131 into p-polarized blue light BLp. The blue light having passed through the retarder 2131 is therefore the mixture of the original s-polarized blue light BLs and the p-polarized blue light BLp mixed at a predetermined ratio.

The rotator 2132 adjusts the angle of rotation of the retarder 2131 to adjust the ratio between the blue light BLs and the blue light BLp contained in the blue light having passed through the retarder 2131. The rotator 2132, which rotates the retarder 2131, may be omitted.

The light source section 21 thus outputs the s-polarized blue light BLs and the p-polarized blue light BLp as the first light.

The light sources 211 are each configured to output the s-polarized blue light BLs as described above and may instead be configured to output the s-polarized blue light BLs and the p-polarized blue light BLp. In this case, the rotary phase retardation apparatus 213 can be omitted. The light sources 211 do not necessarily each include a semiconductor laser and may include another type of solid-state light source, such as an LED (light emitting diode).
Configuration of First Polarization Separator The blue light BLs and the blue light BLp, which form the first light, are incident on the first polarization separator 22 along the direction +X, which is the first direction.

The first polarization separator 22 is a prism-shaped polarization separator formed by combining two prism pieces each being a substantially right-angled isosceles triangular column with each other into a substantially box-like shape, and a polarization separation layer 221 is provided on the interface between the two prism pieces.

The polarization separation layer 221 corresponds to a first polarization separation layer and inclines by 45° with respect to the directions +X and +Z. In detail, the polarization separation layer 221 inclines by 45° with respect to the planes XY and YZ.

The polarization separation layer 221 has a polarization separation characteristic that causes the polarization separation layer 221 to transmit a portion of the light incident thereon that is the portion formed of p-polarized light, which is the first polarization component, and reflect a portion of the incident light that is the portion formed of s-polarized light, which is the second polarization component. The polarization separation layer 221 instead has a wavelength selective polarization separation characteristic that causes the polarization separation layer 221 to transmit p-polarized light, which is the first polarization component, and reflects-polarized light, which is the second polarization component, in a case where the light incident on the polarization separation layer 221 is blue light, whereas causing the polarization separation layer 221 to reflect the light incident thereon irrespective of the polarization sate of the light in a case where the incident light has a wavelength longer than the wavelength of the blue light.

The first polarization separator 22 therefore transmits the p-polarized blue light BLp, which is the first polarization component of the first light, out of the blue light incident on the first polarization separator 22 along the direction +X and reflects the s-polarized blue light BLs, which is the second polarization component of the first light, out of the incident blue light along the direction −Z, which is a second direction perpendicular to the direction +X.

The first polarization separator 22 is not limited to a prism-shaped polarization separator and may instead be a plate-shaped polarization separator including the polarization separation layer 221.

Configuration of Second Polarization Separator

The second polarization separator 23 is located in a position shifted in the direction +X from the first polarization separator 22, and the blue light BLp having passed through the first polarization separator 22 and being the first polarization component of the first light is incident on the second polarization separator 23.

The second polarization separator 23 is a prism-shaped polarization separator, as is the first polarization separator 22, and includes a polarization separation layer 231 provided on the interface between the two prism pieces.

The polarization separation layer 231 corresponds to a second polarization separation layer and inclines by 45° with respect to the directions +X and +Y. In detail, the polarization separation layer 231 inclines by 45° with respect to the planes XY and YZ. The polarization separation layer 231 is parallel to the polarization separation layer 221.

The polarization separation layer 231 has a wavelength selective polarization separation characteristic that causes the polarization separation layer 231 to reflect blue light and handles light having wavelengths longer than the wavelength of the blue light in such a way that the polarization separation layer 231 reflects s-polarized light, which is the second polarization component, and transmits p-polarized light, which is the first polarization component.

The second polarization separator 23 therefore reflects the blue light BLp having been incident from the first polarization separator 22 and being the first polarization component of the first light in such a way that the reflected light travels in the direction −Z, which is the second direction.

The second polarization separator 23 is not limited to a prism-shaped polarization separator and may instead be a plate-shaped polarization separator including the polarization separation layer 231.

Configuration of First Retarder

The first retarder 24 is located in a position shifted in the direction −Z, which is the second direction, from the first polarization separator 22. That is, the first retarder 24 is located between the first polarization separator 22 and the first reflector 26 in the direction −Z.

The first retarder 24 is a quarter-wave plate and converts the blue light BLs reflected off the first polarization separator 22 into circularly polarized blue light BLc1, which is then incident on the first light collector 25. That is, the first retarder 24 converts the polarization component of the incident blue light, which is the first light. In other words, the first retarder 24 converts the polarization state of the incident blue light.

Configuration of First Light Collector

The first light collector 25 is located in a position shifted in the direction −Z from the first retarder 24. That is, the first light collector 25 is located between the first retarder 24 and the first reflector 26 in the direction −Z.

The first light collector 25 collects the blue light BLc1 incident from the first retarder 24 into a spot on the first reflector 26. The first light collector 25 parallelizes blue light Blc2 incident from the first reflector 26. In the example shown in FIG. 2, the first light collector 25 is formed of two lenses 251 and 252, but the number of lenses that form the first light collector 25 is not limited to a specific number.

Configuration of First Reflector

The first reflector 26 is located in a position shifted in the direction −Z from the first light collector 25. That is, the first reflector 26 is located in a position shifted in the direction −Z from the first polarization separator 22.

The first reflector 26 diffusively reflects the blue light BLc1 incident from the first light collector 25 in the direction −Z in such a way that the reflected light travels in the direction +Z at a diffusion angle equal to the diffusion angle of yellow light YL outputted from the wavelength converter 28, which will be described later. The first reflector 26 includes a reflection plate 261, which has a reflection characteristic close to Lambertian reflection characteristic and reflects the incident blue light BLc1, and a rotating section 262, which rotates the reflection plate 261 around an axis of rotation Rx parallel to the direction +Z.

The blue light BLc1 incident on the reflection plate 261 is converted, when reflected off the reflection plate 261, into blue light BLc2, which is circularly polarized light having a polarization rotation direction opposite the polarization rotation direction of the incident blue light BLc1.

The blue light Blc2 outputted from the first reflector 26 passes through the first light collector 25 in the direction +Z and is then incident on the first retarder 24 again. The blue light BLc2 incident from the first light collector 25 on the first retarder 24 is converted not into the s-polarized blue light BLs incident from the first polarization separator 22 on the first retarder 24 but into the p-polarized blue light BLp. The converted blue light BLp passes through the first polarization separator 22 in the direction +Z and is incident on the first color separator 29.

Configuration of Second Light Collector

The second light collector 27 is located in a position shifted in the direction −Z, which is the second direction, from the second polarization separator 23. That is, the second light collector 27 is located between the second polarization separator 23 and the wavelength converter 28 in the direction −Z.

The second light collector 27 collects the blue light BLp reflected off the second polarization separator 23 into a spot on the wavelength converter 28. The second light collector 27 parallelizes the yellow light YL incident from the wavelength converter 28 on the second polarization separator 23. In the example shown in FIG. 2, the second light collector 27 is formed of two lenses 271 and 272, but the number of lenses that form the second light collector 27 is not limited to a specific number.

Configuration of Wavelength Converter

The wavelength converter 28 is located in a position shifted in the direction −Z from the second light collector 27. That is, the wavelength converter 28 is located in a position shifted in the direction −Z, which is the second direction, from the second polarization separator 23.

The wavelength converter 28 is a reflective wavelength converter that is excited with light incident thereon and outputs light having a wavelength different from the wavelength of the incident light in the direction opposite the direction in which the incident light travels. In other words, the wavelength converter 28 is a reflective wavelength converter that converts the wavelength of the incident light and outputs the converted light in the direction opposite the direction in which the incident light travels.

In the present embodiment, the wavelength converter 28 contains a yellow phosphor that is excited with blue light and emits yellow light, and the wavelength converter 28 outputs the non-polarized yellow light YL, which is fluorescence having a wavelength longer than the wavelength of the blue light BLp, which is the excitation light incident along the direction −Z and is the first polarization component of the first light. The yellow light YL has a peak wavelength ranging, for example, from 500 to 700 nm. That is, the yellow light YL is light containing a green light component as a first color component and a red light component as a second color component with the components each being a mixture of s-polarized light and p-polarized light.

The yellow light YL outputted from the wavelength converter 28 passes through the second light collector 27 along the direction +Z, which parallelizes the yellow light YL, and the parallelized yellow light YL is then incident on the second polarization separator 23.

The light source apparatus 2 may include a rotator that rotates the wavelength converter 28 around an axis of rotation parallel to the direction +Z. In this case, the heat dissipation efficiency of the wavelength converter 28 can be increased.

The polarization separation layer 231 of the second polarization separator 23 has the wavelength selective polarization separation characteristic, as described above.

Therefore, out of the non-polarized yellow light YL that is the second light and has been incident on the polarization separation layer 231, s-polarized yellow light YLs is reflected off the polarization separation layer 231 in the direction −X, which is opposite the first direction, and incident on the first polarization separator 22. The polarization separation layer 221 of the first polarization separator 22 has the polarization separation characteristic that causes the polarization separation layer 221 to reflect the s-polarized yellow light YLs, as described above. The yellow light YLs incident on the polarization separation layer 221 in the direction −X is therefore reflected off the first polarization separator 22 in the direction +Z and incident on the first color separator 29.

On the other hand, out of the non-polarized yellow light YL that is the second light and has been incident on the polarization separation layer 231, the p-polarized yellow light YLp passes through the polarization separation layer 231 in the direction +Z and is incident on the third retarder 32.

Configuration of First Color Separator

Figure 3:
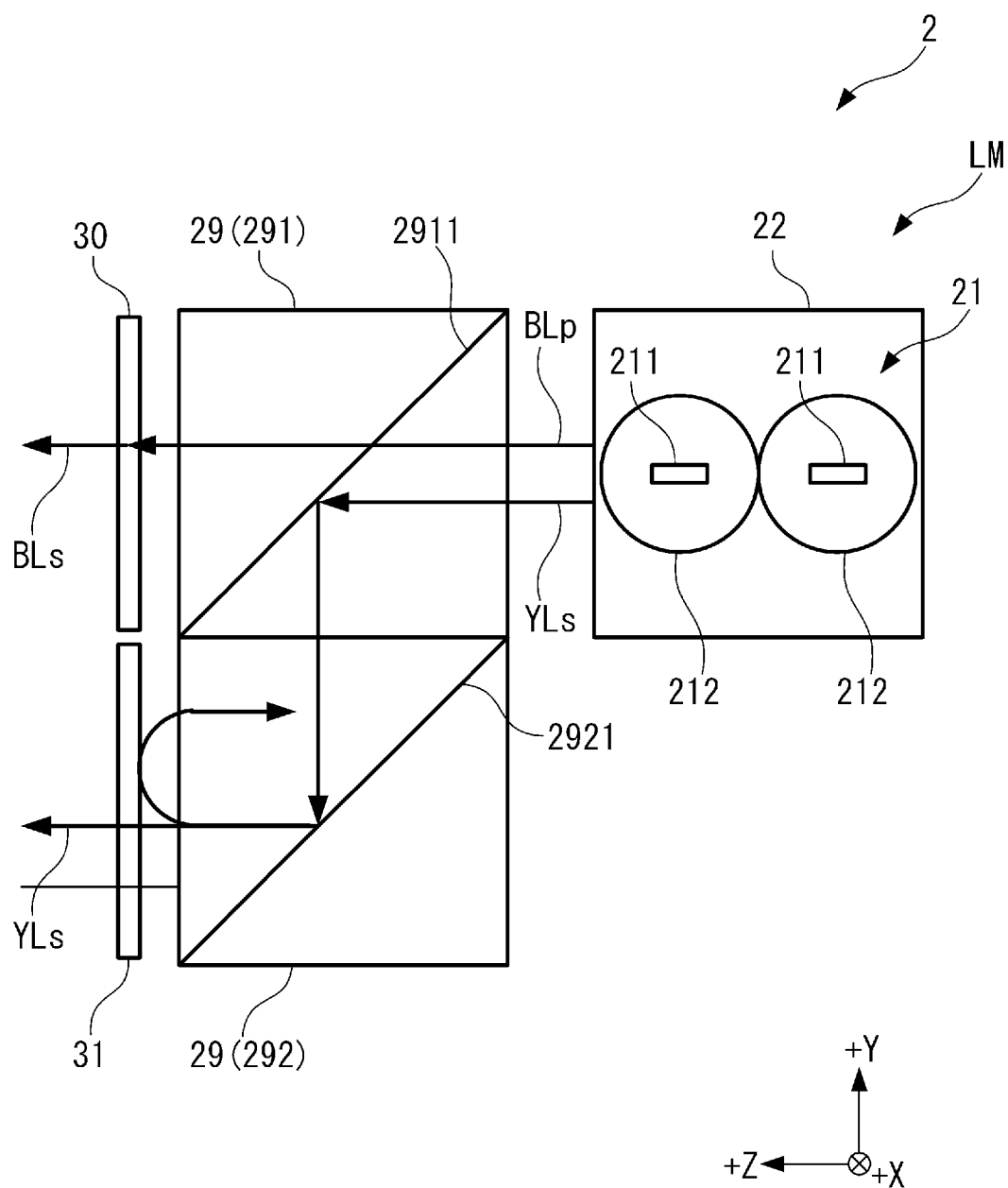
FIG. 3 is a side view showing the light source apparatus in the first embodiment.

FIG. 3 is a side view of the light source apparatus 2 viewed in the direction −X. In other words, FIG. 3 is a diagrammatic view of the second retarder 30 and the second reflector 31 viewed in the direction −X. In FIG. 3, the rotary phase retardation apparatus 213, the first retarder 24, the first light collector 25, and the first reflector 26 are omitted.

The first color separator 29 is located in a position shifted in the direction +Z, which is the third direction opposite the second direction, from the first polarization separator 22, and separates the light outputted from the first polarization separator 22 in the direction +Z into the blue light and the yellow light.

The first color separator 29 includes a dichroic prism 291 and a reflection prism 292, as shown in FIG. 3.

The light outputted from the first polarization separator 22 is incident on the dichroic prism 291. The dichroic prism 291 is a prism-shaped color separator formed by combining two prism pieces each being a substantially right-angled isosceles triangular column with each other into a substantially box-like shape, and a color separation layer 2911 is provided on the interface between the two prism pieces.

The color separation layer 2911 inclines by 45° with respect to the directions +Y and +Z. In detail, the color separation layer 2911 inclines by 45° with respect to the planes XY and YZ.

The color separation layer 2911 transmits the blue light out of the incident light in the direction +Z and reflects color light having wavelengths longer than the wavelength of the blue light in the direction −Y. Therefore, out of the light incident from the first polarization separator 22 on the dichroic prism 291, the blue light BLp, which is the first polarization component of the first light, passes through the color separation layer 2911 in the direction +Z and exits out of the dichroic prism 291. The blue light BLp corresponds to third light before it is converted.

On the other hand, out of the light incident from the first polarization separator 22 on the dichroic prism. 291, the yellow light YLs, which is the second polarization component of the second light, is reflected off the color separation layer 2911 in the direction −Y.

The dichroic prism 291 may be replaced with a dichroic mirror including the color separation layer 2911.

Still instead, the first color separator 29 may include a polarization separator including a polarization separation layer and the reflection prism 292. For example, a polarization separator that transmits the incident blue light BLp in the direction +Z and reflects the yellow light YLs in the direction −Y toward the reflection prism 292 can be employed in place of the dichroic prism 291 of the first color separator 29 to separate the blue light BLp into the blue light BLp and the yellow light YLs, as can the first color separator 29 including the dichroic prism 291.

The reflection prism 292 is located in a position shifted in the direction −Y from the dichroic prism 291. The yellow light YLs reflected off the color separation layer 2911 is incident on the reflection prism 292.

The reflection prism 292 is a prism-shaped reflector formed by combining two prism pieces each being a substantially right-angled isosceles triangular column with each other into a substantially box-like shape, and a reflection layer 2921 is provided on the interface between the two prism pieces.

The reflection layer 2921 inclines by 45° with respect to the directions +Y and +Z. In detail, the reflection layer 2921 inclines by 45° with respect to the planes XY and YZ. That is, the reflection layer 2921 is parallel to the color separation layer 2911.

The reflection layer 2921 reflects the yellow light YLs, which is the second polarization component of the second light and is incident from the dichroic prism 291 on the reflection layer 2921 in the direction −Y in such a way that the reflected light travels in the direction +Z. The yellow light YLs reflected off the reflection layer 2921 exits as fourth light out of the reflection prism 292 in the direction +Z.

The reflection prism 292 may be replaced with a reflection mirror including the reflection layer 2921.

Configuration of Second Retarder

The second retarder 30 is disposed in a position shifted in the direction +Z from the dichroic prism 291 and located in the optical path of the blue light BLp outputted from the dichroic prism 291. The second retarder 30 is a half-wave plate that converts the polarization direction of the light incident thereon and converts the blue light BLp incident from the dichroic prism 291 into the s-polarized blue light BLs, which is the second polarization component of the first light.

The converted s-polarized blue light BLs from the second retarder 30 exits out of as the third light from the light source apparatus 2 in the direction +Z and enters the homogenizer 4.

The second retarder 30 may instead be provided at a surface of the dichroic prism 291 that is the surface via which the blue light BLs exits.

Configuration of Second Reflector

The second reflector 31 is disposed in a position shifted in the direction +Z from the reflection prism 292 and located in the optical path of the yellow light YLs as the fourth light outputted from the reflection prism 292. The second reflector 31 transmits part of the light incident thereon and reflects the remainder.

Therefore, out of the yellow light YLs incident on the second reflector 31, part of the yellow light YLs passes through the second reflector 31, exits out of the polarization separator 2 in the direction +Z, and enters the homogenizer 4. That is, the yellow light YLs is spatially separated from the blue light BLs and enters the homogenizer 4 from the light source apparatus 2 via a light exiting position different from the light exiting position via which the blue light BLs enters the homogenizer 4. In detail, the yellow light YLs enters the homogenizer 4 from the light source apparatus 2 via a light exiting position shifted in the direction −Y from the light exiting position via which the blue light BLs enters the homogenizer 4.

On the other hand, the remainder of the yellow light YLs incident on the second reflector 31 is reflected off the second reflector 31 and incident on the reflection prism 292 again. The remainder of the yellow light YLs incident on the reflection prism 292 is reflected off the reflection layer 2921 in the direction +Y and incident on the wavelength converter 28 via the dichroic prism 291, the first polarization separator 22, the second polarization separator 23, and the second light collector 27.

The yellow phosphor contained in the wavelength converter 28 hardly absorbs yellow light externally incident thereon. The yellow light YLs incident on the wavelength converter 28 therefore undergoes repeated reflection in the wavelength converter 28 into non-polarized yellow light YL, which exits out of the wavelength converter 28 along with the yellow light YL produced in the yellow phosphor. The yellow light YL outputted from the wavelength converter 28 is then incident on the second polarization separator 23 via the second light collector 27, as described above.

The ratio between the amount of yellow light YLs passing through the second reflector 31 and the amount of yellow light YLs reflected off the second reflector 31 can be set in advance. The second reflector 31 may instead be provided at a surface of the reflection prism 292 that is the surface via which the yellow light YLs exits.

Configuration of Third Retarder

Figure 4:
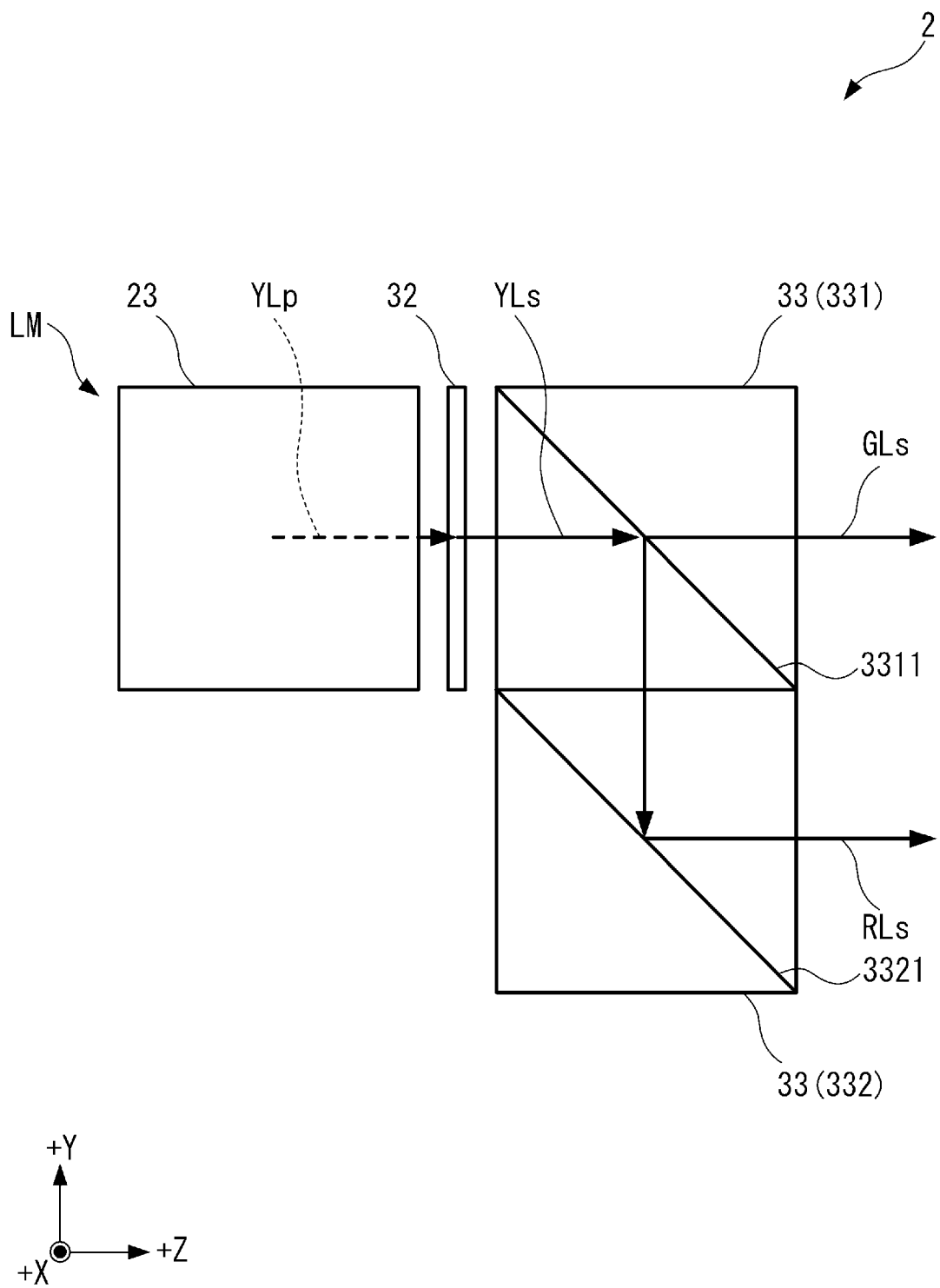
FIG. 4 is a side view of the light source apparatus in the first embodiment.

FIG. 4 is a side view of the light source apparatus 2 viewed in the direction +X. In other words, FIG. 4 is a diagrammatic view showing the third retarder 32 and the second color separator 33 viewed in the direction +X. In FIG. 4, the second light collector 27 and the wavelength converter 28 are omitted.

The third retarder 32 is located in a position shifted from the second polarization separator 23 in the direction +Z, which is the third direction opposite the second direction, as shown in FIGS. 2 and 4. The yellow light YLp having passed through the second polarization separator 23 is incident on the third retarder 32.

The third retarder 32 is a half-wave plate and converts the yellow light YLp into the s-polarized yellow light YLs, which is the second polarization component of the second light. The converted s-polarized yellow light YLs is incident on the second color separator 33.

Configuration of Second Color Separator

The second color separator 33 is located in a position shifted in the direction +Z from the third retarder 32. That is, the second color separator 33 is located in a position shifted in the direction +Z, which is the third direction opposite the second direction, from the second polarization separator 23. The second color separator 33 separates the green light component, which is the first color component, and the red light component, which is the second color component, from the yellow light YLs outputted in the direction +Z from the second polarization separator 23 and converted by the third retarder 32 into s-polarized light.

The second color separator 33 includes a dichroic prism 331 and a reflection prism 332, as shown in FIG. 4.

The dichroic prism 331 is a prism-shaped color separator as is the dichroic prism. 291, and a color separation layer 3311 is provided on the interface between the two prism pieces. The color separation layer 3311 inclines by 45° with respect to the directions +Y and +Z. In detail, the color separation layer 3311 inclines by 45° with respect to the planes XY and YZ and is parallel to the color separation layer 2911 and the reflection layer 2921.

The color separation layer 3311 transmits the green light component out of the incident light in the direction +Z and reflects the red light component out of the incident light in the direction −Y. Therefore, out of the yellow light YLs incident on the dichroic prism 331, the green light GLs, which is the green light component of the s-polarized light, passes through the color separation layer 3311 in the direction +Z and exits as fifth light out of the dichroic prism 331. That is, the green light GLs is spatially separated from the blue light BLs and the yellow light YLs and enters the homogenizer 4 via a position different from the positions via which the blue light BLs and the yellow light YLs enter the homogenizer 4. In detail, the green light GLs enters the homogenizer 4 from the light source apparatus 2 via a light exiting position shifted in the direction +X from the light exiting position via which the blue light BLs enters the homogenizer 4.

On the other hand, out of the yellow light YLs incident on the dichroic prism 331, the red light RLs, which is the red light component of the s-polarized light, is reflected off the color separation layer 3311 in the direction −Y.

The reflection prism 331 may be replaced with a dichroic mirror including the color separation layer 3311.

The reflection prism 332 has the same configuration as that of the reflection prism 292. That is, the reflection prism 332 includes a reflection layer 3321, which is parallel to the color separation layers 2911 and 3311 and the reflection layer 2921.

The reflection layer 3321 reflects the red light RLs reflected off the color separation layer 3311 and incident on the reflection layer 3321 in such a way that the reflected light travels in the direction +Z. The red light RLs reflected off the reflection layer 3321 exits as sixth light out of the reflection prism 332. The red light RLs then exits out of the light source apparatus 2 in the direction +Z and enters the homogenizer 4. That is, the red light RLs is spatially separated from the blue light BLs, the yellow light YLs, and the green light GLs and enters the homogenizer 4 via a position different from the positions via which the blue light BLs, the yellow light YLs, and the green light GLs enter the homogenizer 4. In detail, the red light RLs enters the homogenizer 4 from the light source apparatus 2 via a light exiting position shifted in the direction −Y from the light exiting position via which the green light GLs enters the homogenizer 4 and shifted in the direction +X from the light exiting position via which the yellow light YLs enters the homogenizer 4.

Configuration of Homogenizer

The homogenizer 4 homogenizes the illuminance at the light modulator 6 illuminated with the light outputted from the light source apparatus 2, as shown in FIG. 1. The homogenizer 4 includes two multi-lenses 41 and 42 and a superimposing lens 43.

The multi-lens 41 includes a plurality of lenses 411 arranged in a matrix in a plane perpendicular to the center axis of the light flux incident from the light source apparatus 2 on the multi-lens 41. In other words, the multi-lens 41 includes a plurality of lenses 411 arranged in a matrix in a plane perpendicular to the illumination optical axis Ax. The multi-lens 41 divides the light incident from the light source apparatus 2 into a plurality of sub-light fluxes.

Figure 5:
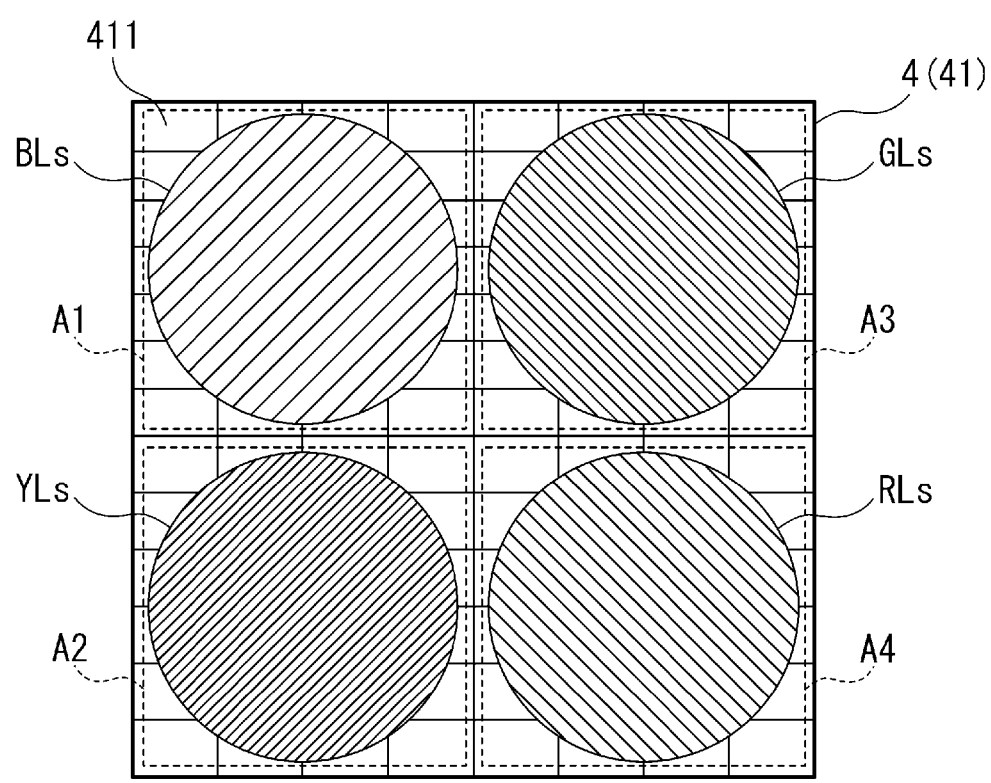
FIG. 5 is a diagrammatic view showing color light incident positions on a multi-lens in the first embodiment.

FIG. 5 is a diagrammatic view showing the color light incident positions on the multi-lens 41 viewed in the direction −Z.

The blue light BLs outputted as the third light, the yellow light YLs outputted as the fourth light, the green light GLs outputted as the firth light, and the red light RLs outputted as the sixth light, which are all outputted from the light source apparatus 2, are incident on the multi-lens 41, as shown in FIG. 5.

The blue light BLs having exited out of the light source apparatus 2 via a position shifted in the directions −X and +Y is incident on a plurality of lenses 411 disposed in a region A1 of the multi-lens 41, which is a region shifted in the directions −X and +Y.

The yellow light YLs having exited out of the light source apparatus 2 via a position shifted in the directions −X and −Y is incident on a plurality of lenses 411 disposed in a region A2 of the multi-lens 41, which is a region shifted in the directions −X and −Y.

The green light GLs having exited out of the light source apparatus 2 via a position shifted in the directions +X and +Y is incident on a plurality of lenses 411 disposed in a region A3 of the multi-lens 41, which is a region shifted in the directions +X and +Y.

The red light RLs having exited out of the light source apparatus 2 via a position shifted in the directions +X and −Y is incident on a plurality of lenses 411 disposed in a region A4 of the multi-lens 41, which is a region shifted in the directions +X and −Y.

The color light fluxes incident on the lenses 411 each form a plurality of sub-light fluxes, which are incident on the corresponding lenses 421 in the multi-lens 42.

The multi-lens 42 includes a plurality of lenses 421 corresponding to the plurality of lenses 411, as shown in FIG. 1, and the plurality of sub-light fluxes having exited out of the lenses 411 are incident on the corresponding lenses 421. The lenses 421 then cause the sub-light fluxes incident thereon to be incident on the superimposing lens 43.

The superimposing lens 43 superimposes the plurality of sub-light fluxes incident from the multi-lens 42 on one another at the light modulator 6.

In detail, the multi-lens 42 and the superimposing lens 43 cause the plurality of blue divided sub-light fluxes BLs, the plurality of yellow divided sub-light fluxes YLs, the plurality of green divided sub-light fluxes GLs, and the plurality of red divided sub-light fluxes RLs to be incident at different angles of incidence on a plurality of microlenses 621, which form a microlens array 62, which will be described later, in the light modulator 6.

Configuration of Light Modulator

The light modulator 6 provided in the projector 1 is formed of one light modulator, as shown in FIG. 1. The light modulator 6 modulates the light outputted from the light source apparatus 2. In detail, the light modulator 6 modulates each of the color light fluxes outputted from the light source apparatus 2 and incident on the light modulator 6 via the homogenizer 4 and the field lens 5 in accordance with image information to form an image according to the image information. The light modulator 6 includes one liquid crystal panel 61 and one microlens array 62.

Configuration of Liquid Crystal Panel

Figure 6:
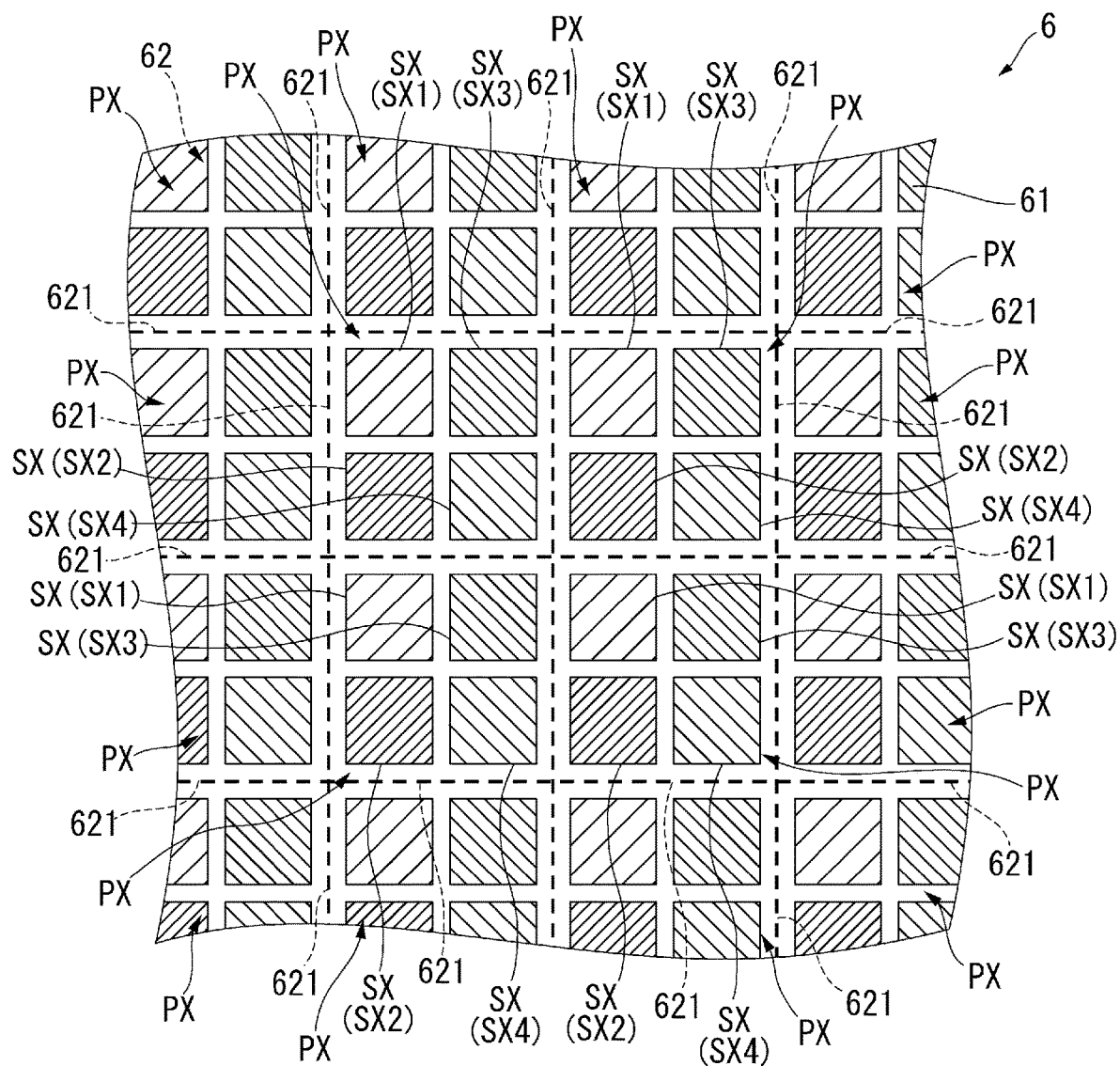
FIG. 6 is an enlarged diagrammatic view showing part of a light modulator in the first embodiment.

FIG. 6 is an enlarged diagrammatic view showing part of the light modulator 6 viewed in the direction −Z. In other words, FIG. 6 is a diagrammatic view showing the correspondence between pixels PX provided in the liquid crystal panel 61 and the microlenses 621 provided in the microlens array 62.

The liquid crystal panel 61 includes a plurality of pixels PX arranged in a matrix in a plane perpendicular to the illumination optical axis Ax, as shown in FIG. 6.

The pixels PX each include a plurality of sub-pixels SX, which modulate the corresponding color light flux. In the present embodiment, the pixels PX each include four sub-pixels SX (SX1 to SX4).

Specifically, in one pixel PX, a first sub-pixel SX1 is disposed in a position shifted in the directions −X and +Y, and a second sub-pixel SX2 is disposed in a position shifted in the directions −X and −Y. Further, in one pixel PX, a third sub-pixel SX3 is disposed in a position shifted in the directions +X and +Y, and a fourth sub-pixel SX4 is disposed in a position shifted in the directions +X and −Y.

Configuration of Microlens Array

The microlens array 62 is provided in a position shifted in the direction −Z, which is the direction toward the light incident side, from the liquid crystal panel 61 and guides incident color light fluxes to the corresponding pixels PX. The microlens array 62 includes a plurality of microlenses 621 corresponding to the plurality of pixels PX.

The plurality of microlenses 621 are arranged in a matrix in a plane perpendicular to the illumination optical axis Ax. In other words, the plurality of microlenses 621 are arranged in a matrix in a plane perpendicular to the center axis of the light incident from the field lens 5. In the present embodiment, the microlenses 621 are provided in correspondence with two sub-pixels SX arranged in the direction +X and two sub-pixels SX arranged in the direction +Y.

The blue light BLs, the yellow light YLs, the green light GLs, and the red light RLs superimposed on one another by the homogenizer 4 are incident on the microlenses 621 at different angles. The microlenses 621 cause the color light fluxes incident thereon to be incident on corresponding sub-pixels SX.

Specifically, in the present embodiment, one microlens 621 is provided in correspondence with one pixel PX. That is, one microlens 621 is provided in correspondence with the four sub-pixels SX1 to SX4, which form one pixel PX. The thus configured microlenses 621 each guide the blue light BLs, which is the third light, to the first sub-pixel SX1 out of the sub-pixels SX of the pixel PX corresponding to the microlens 621 and guide the yellow light YLs, which is the fourth light, to the second sub-pixel SX2 out of the sub-pixels SX of the corresponding pixel PX. Further, the microlenses 621 each guide the green light GLs, which is the fifth light, to the third sub-pixel SX3 out of the sub-pixels SX of the corresponding pixel PX and guide the red light RLs, which is the sixth light, to the fourth sub-pixel SX4 out of the sub-pixels SX of the corresponding pixel PX.

The color light fluxes corresponding to the sub-pixels SX1 to SX4 are thus incident thereon, and the sub-pixels SX1 to SX4 modulate the corresponding color light fluxes.

The light modulated by the thus configured liquid crystal panel 61, that is, the image forming light is projected by the projection optical apparatus 7 on the projection receiving surface that is not shown, as described above.

Effects of First Embodiment

The projector 1 according to the present embodiment described above can provide the following effects.

The projector 1 includes the light source apparatus 2, the light modulator 6, which modulates the light outputted from the light source apparatus 2, and the projection optical apparatus 7, which projects the light modulated by the light modulator 6.

The light source apparatus 2 includes the light source section 21, the first polarization separator 22, the second polarization separator 23, the first retarder 24, the first reflector 26, the wavelength converter 28, the first color separator 29, the second retarder 30, the third retarder 32, and the second color separator 33.

The light source section 21 outputs the blue light BLs and BLp as the first light. The first polarization separator 22, on which the blue light BLs and BLp outputted from the light source section 21 are incident on the first polarization separator 22 along the direction +X, which is the first direction, transmits the p-polarized blue light BLp, which is the first polarization component of the first light, out of the blue light BLs and BLp in such a way that the transmitted light travels in the direction +X and reflects the s-polarized blue light BLs, which is the second polarization component of the first light, out of the blue light BLs and Bp in such a way that the reflected light travels in the direction −Z, which is the second direction perpendicular to the direction +X. The second polarization separator 23 is located in a position shifted from the first polarization separator 22 in the direction +X and reflects the blue light BLp incident in the direction +X in such a way that the reflected light travels in the direction −Z. The first reflector 26 is located in a position shifted from the first polarization separator 22 in the direction −Z and reflects the incident blue light in the direction +Z, which is opposite the second direction. The first retarder 24 is located between the first polarization separator 22 and the first reflector 26 in the direction −Z and converts the polarization component of the blue light incident from the first polarization separator 22. The wavelength converter 28 is located in a position shifted from the second polarization separator 23 in the direction −Z and outputs the yellow light YL, which is the non-polarized second light produced by converting the wavelength of the blue light BLp, which is the first polarization component of the first light incident in the direction −Z, in such a way that the outputted light travels in the direction +Z, which is opposite the second direction.

The first color separator 29 is located in a position shifted from the first polarization separator 22 in the direction +Z and separates the blue light BLp and the yellow light YLs incident in the direction +Z from the first polarization separator 22 into the blue light BLp and the yellow light YLs. The blue light BLp separated by the first color separator 29 is the third light before it is converted, and the yellow light YLs is the fourth light.

The second retarder 30 is a half-wave plate located in the optical path of the blue light BLp separated by the first color separator 29, converts the polarization direction of the blue light BLp to form the s-polarized blue light BLs, and outputs the blue light BLs as the third light.

The third retarder 32 is a half-wave plate which is located in a position shifted from the second polarization separator 23 in the direction +Z and on which the yellow light YLp, which is the second light having passed through the second polarization separator 23, and the third retarder 32 converts the polarization direction of the yellow light YLp and outputs the s-polarized yellow light YLs.

The second color separator 33 is located in a position shifted from the third retarder 32 in the direction +Z and separates the yellow light YLs, which is the second light incident from the third retarder 32, into the green light component, which is the first color component, and the red light component, which is the second color component.

The second polarization separator 23 transmits the p-polarized yellow light YLp, which is the first polarization component of the second light, out of the yellow light YL incident in the direction +Z in such a way that the transmitted light travels in the direction +Z and is incident on the third retarder 32 and reflects the s-polarized yellow light YLs, which is the second polarization component of the second light, in the direction −X, which is the fourth direction.

The first polarization separator 22 transmits the blue light BLp, which is the first polarization component of the first light incident in the direction +Z, in such a way that the blue light BLp travels in the direction +Z and is incident on the first color separator 29 and reflects the yellow light YLs, which is the second polarization component of the second light incident in the direction −X, in such a way that the yellow light YLs travels in the direction +Z and is incident on the first color separator 29.

The first color separator 29 outputs the blue light BLp incident from the first polarization separator 22 as the third light before it is converted to the second retarder 30 and outputs the yellow light YLs incident from the first polarization separator 22 as the fourth light. The blue light BLp is converted by the second retarder 30 into the blue light BLs and outputted as the third light, as described above.

The second color separator 33 outputs the green light GLs, which is the green light component contained in the yellow light YLs incident from the third retarder 32, as the fifth light and outputs the red light component as the sixth light.

The configuration described above allows the light source apparatus 2 to output the blue light BLs, the yellow light YLs, the green light GLs, and the red light RLs that are a plurality of color light fluxes spatially separate from one another and aligned with one another in the form of s-polarized light, which is the second polarization component, with use of no small-interval polarization converter described above. The size of the light source apparatus 2 can therefore be reduced, and the size of the projector 1 can be reduced accordingly.

Further, since the yellow light YLs is incident in addition to the blue light BLs, the green light GLs, and the red light RLs on the light modulator 6, an image formed by the light modulator 6 and projected by the projection optical apparatus 7 can have increased luminance.

The light source section 21 includes the light sources 211 and the retarder 2131 as the fourth retarder, which converts part of the blue light BLs, which is outputted from the light sources 211 and is the second polarization component of the first light, into the blue light BLp, which is the first polarization component of the first light.

The configuration described above allows the blue light BLp, which is the first polarization component of the first light, and the blue light BLs, which is the second polarization component of the first light, to be reliably incident on the first polarization separator 22. In addition to the above, the light sources 211 can each be formed of a kind of solid-state light source, whereby the light sources 211 can be readily configured.

The light source section 21 further includes the rotator 2132, which rotates the retarder 2131 around an axis of rotation along the direction +X.

The configuration described above allows adjustment of the angle of rotation of the retarder 2131 to adjust the ratio between the blue light BLs and the blue light BLp outputted from the retarder 2131 and incident on the first polarization separator 22. The ratio among the blue light BLs, the yellow light YLs, the green light GLs, and the red light RLs outputted from the light source apparatus 2 can therefore be adjusted, whereby the versatility of the light source apparatus 2 can be increased.

The light source apparatus 2 includes the second reflector 31, which is located in the optical path of the yellow light YLs, which is the fourth light, and reflects part of the incident yellow light YLs toward the reflection prism 292 of the first color separator 29.

The configuration described above allows adjustment of the ratio of the yellow light YLs outputted from the light source apparatus 2 to the green light GLs and the red light RLs outputted therefrom. Increasing the proportion of the yellow light YLs allows an increase in luminance of a projected image, whereas increasing the proportion of the green light GLs and the red light RLs allows an increase in color reproducibility of a projected image.

The light source apparatus 2 further includes the first light collector 25, which is located between the first retarder 24 and the first reflector 26 and collects the blue light BLs incident from the first retarder 24 into a spot at the first reflector 26.

The configuration described above allows the first light collector 25 to efficiently collect the blue light BLs outputted from the first retarder 24 and parallelize the blue light BLs outputted from the first reflector 26. Loss of the blue light BLs can therefore be suppressed, whereby the blue light BLs can be used at increased efficiency.

The light source apparatus 2 further includes the second light collector 27, which is located between the second polarization separator 23 and the wavelength converter 28 and collects the blue light BLp incident from the second polarization separator 23 into a spot at the wavelength converter 28.

The configuration described above allows the second light collector 27 to efficiently collect the blue light BLp outputted from the second polarization separator 23 and parallelize the yellow light YL outputted from the wavelength converter 28. Loss of the blue light BLp and the yellow light YL can therefore be suppressed, whereby the blue light BLp and the yellow light YL can be used at increased efficiency.

The projector 1 includes the homogenizer 4, which is located between the light source apparatus 2 and the light modulator 6. The homogenizer 4 includes the two multi-lenses 41 and 42, which divide the light incident from the light source apparatus 2 into a plurality of sub-light fluxes, and the superimposing lens 43, which superimposes the plurality of sub-light fluxes incident from the two multi-lenses 41 and 42 on one another at the light modulator 6.

The configuration described above allows the light modulator 6 to be substantially uniformly illuminated with the blue light BLs, the yellow light YLs, the green light GLs, and the red light RLs spatially separated from one another and outputted from the light source apparatus 2. Color unevenness and luminance unevenness in a projected image can therefore be suppressed.

The light modulator 6 includes one liquid crystal panel 61, which is located on the light incident side of the liquid crystal panel 61 and includes a plurality of pixels PX, and the microlens array 62, which includes a plurality of microlenses 621 corresponding to the plurality of pixels PX. The plurality of pixels PX each have the first sub-pixel SX1, the second sub-pixel SX2, the third sub-pixel SX3, and the fourth sub-pixel SX4, and the plurality of microlenses 621 each cause the blue light BLs, which is the third light, to be incident on the first sub-pixel SX1, the yellow light YLs, which is the fourth light, to be incident on the second sub-pixel SX2, the green light GLs, which is the fifth light, to be incident on the third sub-pixel SX3, and the red light RLs, which is the sixth light, to be incident on the fourth sub-pixel SX4.

The plurality of color light fluxes to be incident on the light modulator 6 can thus be incident via each of the microlenses 621 on the sub-pixels SX of the corresponding pixel PX in the liquid crystal panel 61. The color light fluxes outputted from the light source apparatus 2 can therefore be efficiently incident on the sub-pixels SX, whereby the color light fluxes can be used at increased efficiency.

The light source module LM is used in the light source apparatus 2 and outputs the plurality of color light fluxes. The light source module LM includes the light source section 21, the first polarization separator 22, the second polarization separator 23, the first retarder 24, the first reflector 26, and the wavelength converter 28.

The light source section 21 outputs the blue light BLs and BLp as the first light. The first polarization separator 22, on which the blue light BLs and BLp outputted from the light source section 21 are incident on the first polarization separator 22 along the direction +X, which is the first direction, transmits the blue light BLp, which is the first polarization component of the first light, out of the blue light BLs and BLp in such a way that the transmitted light travels in the direction +X and reflects the blue light BLs, which is the second polarization component of the first light, out of the blue light BLs and Bp in such a way that the reflected light travels in the direction −Z, which is the second direction perpendicular to the first direction. The second polarization separator 23 is located in a position shifted from the first polarization separator 22 in the direction +X and reflects the blue light BLp incident in the direction +X in such a way that the reflected light travels in the direction −Z.

The first reflector 26 is located in a position shifted from the first polarization separator 22 in the direction −Z and reflects the incident blue light in the direction +Z, which is opposite the second direction. The first retarder 24 is located between the first polarization separator 22 and the first reflector 26 in the direction −Z and converts the polarization component of the first light. The wavelength converter 28 is located in a position shifted from the second polarization separator 23 in the direction −Z and outputs the yellow light YL, which is the non-polarized second light produced by converting the wavelength of the blue light BLp, which is the first polarization component of the incident first light, in such a way that the outputted light travels in the direction +Z.

The second polarization separator 23 transmits the p-polarized yellow light YLp, which is the first polarization component of the second light, out of the yellow light YL incident in the direction +Z in such away that the transmitted light travels in the direction +Z and reflects the s-polarized yellow light YLs, which is the second polarization component of the second light, in the direction −X, which is the fourth direction. The first polarization separator 22 transmits the blue light BLp, which is the first polarization component of the first light incident in the direction +Z, in such a way that the blue light BLp travels in the direction +Z and reflects the yellow light YLs, which is the second polarization component of the second light incident in the direction −X, in such a way that the yellow light YLs travels in the direction +Z.

The configuration described above allows the blue light BLp and the yellow light YLs to exit out of the first polarization separator 22 and the yellow light YLp to exit out of the second polarization separator 23. Use of the thus configured light source module LM allows a light source apparatus 2 capable of outputting a plurality of color light fluxes having an aligned polarization direction and spatially separated from one another to be readily configured.

Second Embodiment

A second embodiment of the present disclosure will next be described.

A projector according to the present embodiment has the same configuration as that of the projector 1 according to the first embodiment except that the light source apparatus includes a third color separator in place of the second reflector 31. In the following description, a portion that is identical or substantially identical to a portion having already been described has the same reference character and will not be described.

Figure 7:
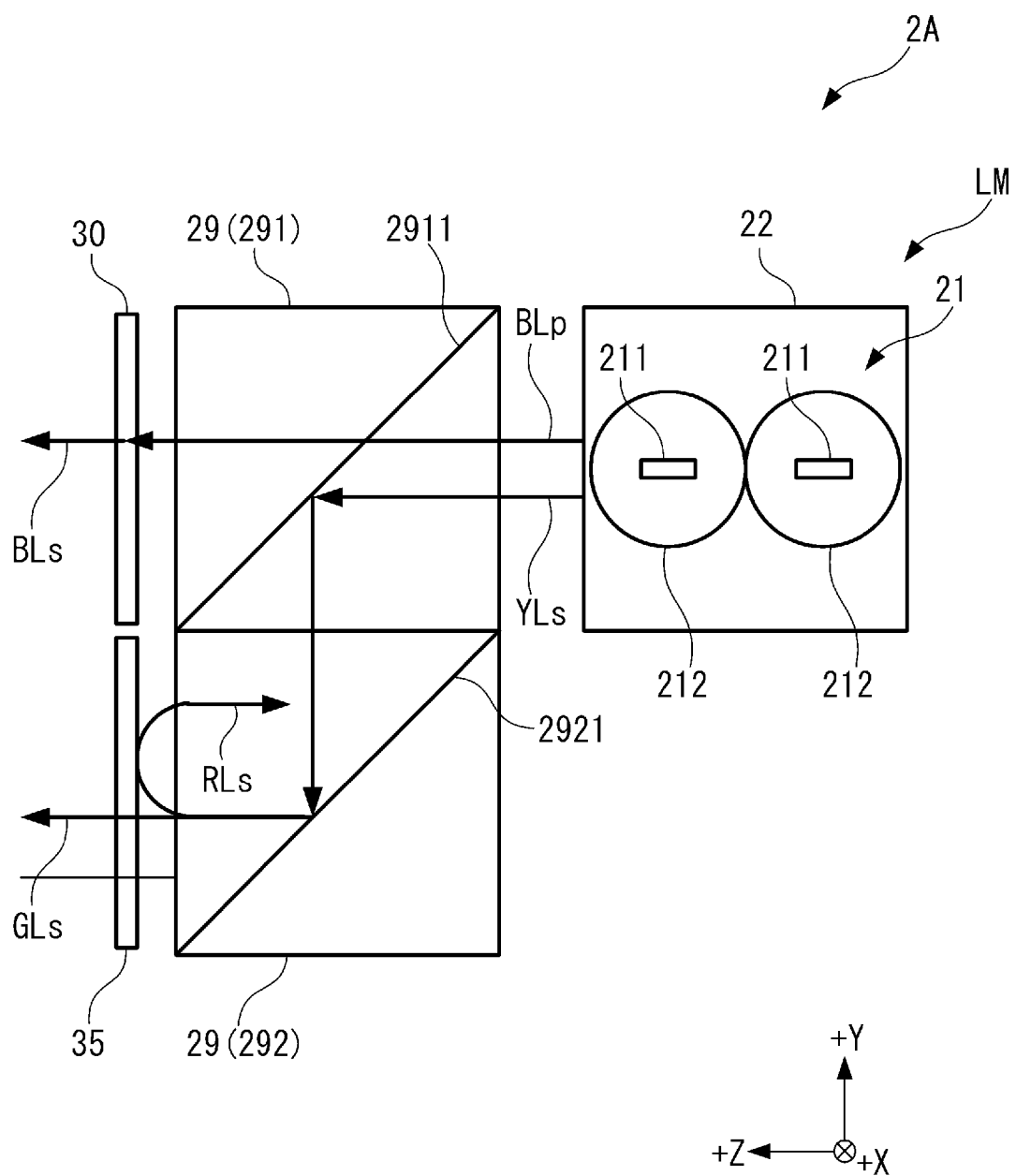
FIG. 7 is a diagrammatic view showing part of a light source apparatus provided in a projector according to a second embodiment.

FIG. 7 is a diagrammatic view showing part of a light source apparatus 2A provided in the projector according to the present embodiment. In detail, FIG. 7 is a side view of the light source apparatus 2A viewed in the direction −X. In FIG. 7, the rotary phase retardation apparatus 213, the first retarder 24, the first light collector 25, and the first reflector 26 are omitted.

The projector according to the present embodiment has the same configuration and function as those of the projector 1 according to the first embodiment except that the light source apparatus 2 is replaced with the light source apparatus 2A.

The light source apparatus 2A has the same configuration as that of the light source apparatus 2 except that the second reflector 31 is replaced with a third color separator 35, as shown in FIG. 7. That is, the light source apparatus 2A includes the light source module LM.

Also, in the present embodiment, p-polarized light corresponds to the first polarization component, and s-polarized light corresponds to the second polarization component.

The third color separator 35 is disposed in the optical path of the yellow light YLs separated by the first color separator 29. The third color separator 35 is a dichroic mirror characterized in that it transmits green light and reflects red light. That is, the third color separator 35 transmits green light GLs, which is light that belongs to substantially the same wavelength band to which the green light GLs as the fifth light belongs, and reflects red light RLs, which is light that belongs to substantially the same wavelength band to which the red light RLs as the sixth light belongs, toward the first color separator 29.

The green light GLs contained in the yellow light YLs incident from the reflection prism 292 of the first color separator 29 on the third color separator 35 passes through the third color separator 35 and exits out of the light source apparatus 2A. That is, the light source apparatus 2A outputs the green light GLs as the fourth light in place of the yellow light YLs, which is the fourth light in the first embodiment.

On the other hand, the red light RLs contained in the yellow light YLs incident on the third color separator 35 is reflected off the third color separator 35 and incident on the reflection prism 292 in the direction +Z. The red light RLs is then incident on the wavelength converter 28 via the first color separator 29, the first polarization separator 22, the second polarization separator 23, and the second light collector 27, as is the yellow light YLs reflected off the second reflector 31 in the light source apparatus 2.

Since the yellow phosphor contained in the wavelength converter 28 hardly absorbs yellow light externally incident thereon as described above, the yellow phosphor does not absorb the red light RLs. The red light RLs incident on the wavelength converter 28 therefore undergoes repeated reflection in the wavelength converter 28 into non-polarized red light, which exits out of the wavelength converter 28 along with the yellow light YL produced in the yellow phosphor.

Out of the red light outputted from the wavelength converter 28, the s-polarized red light RLs is reflected off the third color separator 35 and returns to the wavelength converter 28, whereas the p-polarized red light passes through the second polarization separator 23 in the direction +Z and eventually exits out of the light source apparatus 2A.

A dichroic mirror is employed as the thus configured third color separator 35 in the present embodiment, and a dichroic prism may instead be used.

Figure 8:
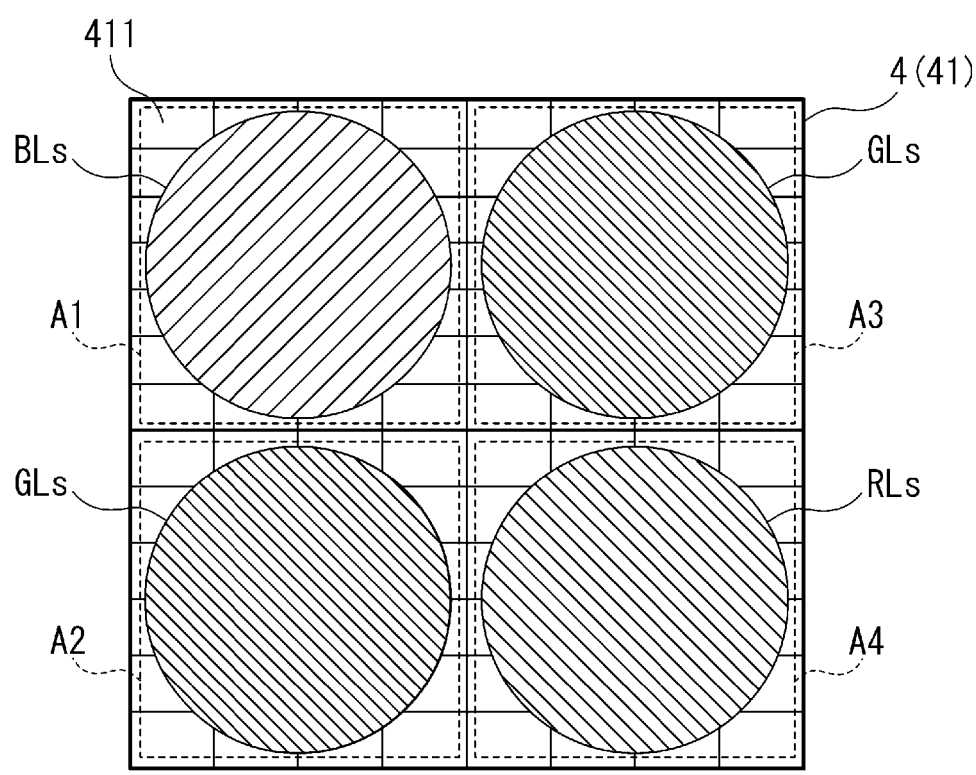
FIG. 8 is a diagrammatic view showing the color light incident positions on the multi-lens in the second embodiment.

FIG. 8 is a diagrammatic view showing the color light incident positions on the multi-lens 41 of the light source apparatus 2A.

The light source apparatus 2A outputs the green light GLs in place of the yellow light YLs, which is the fourth light in the first embodiment. That is, the light source apparatus 2A outputs the blue light BLs as the third light, the green light GLs that is the fourth light in place of the yellow light YLs as the fourth light, the green light GLs as the fifth light, and the red light RLs as the sixth light.

The green light GLs as the fourth light is outputted from the light source apparatus 2A via a position shifted in the directions −X and −Y and incident on the plurality of lenses 411 disposed in the region A2 of the multi-lens 41, which is a region shifted in the directions −X and −Y, as shown in FIG. 8.

Although not shown, the green light GLs as the fourth light is incident on the microlenses 621 via the multi-lenses 41 and 42, the superimposing lens 43, and the field lens 5, as is the yellow light YLs in the projector 1. The green light GLs having been incident on each of the microlenses 621 is incident on the second sub-pixel SX2 provided in the corresponding pixel PX.

Effects of Second Embodiment

The projector according to the present embodiment described above can provide the same effects as those provided by the projector 1 according to the first embodiment and can further provide the following effects.

The light source apparatus 2A includes the third color separator 35, which is disposed in the optical path of the yellow light YLs as the fourth light, transmits the green light GLs, which is light that belongs to substantially the same wavelength band to which the green light GLs as the fifth light belongs out of the incident yellow light YLs, and reflects red light RLs, which is light that belongs to substantially the same wavelength band to which the red light RLs as the sixth light belongs out of the incident yellow light YLs, toward the first color separator 29.

The thus configured third color separator 35 allows an increase in the amount of green light GLs incident on the pixels PX. The color purity of a projected image can therefore be increased.

The third color separator 35 may instead reflect the green light GLs and transmit the red light RLs.

Depending on the yellow phosphor contained in the wavelength converter 28, the red light contained in the yellow light YL outputted from the wavelength converter 28 is insufficient in some cases.

To handle such cases, provided that the third color separator 35 reflects the green light GLs and transmits the red light RLs, the red light is allowed to be incident on the second sub-pixel SX2 and the fourth sub-pixel SX4 out of the sub-pixels SX1 to SX4, which form each of the pixels PX. In this case, the color purity of a projected image can be increased.

Variations of Embodiment

The present disclosure is not limited to the embodiments described above, and variations, improvements, and other modifications to the extent that the advantage of the present disclosure is achieved fall within the scope of the present disclosure.

In each of the embodiments described above, the position via which the first color separator 29 outputs the yellow light YLs is shifted in the direction −Y from the position via which the first color separator 29 outputs the blue light BLs, and the position via which the second color separator 33 outputs the red light RLs is shifted in the direction −Y from the position via which the second color separator 33 outputs the green light GLs, but not necessarily. The position via which the first color separator 29 outputs the yellow light YLs may be shifted in the direction +Y from the position via which the first color separator 29 outputs the blue light BLs, and the position via which the second color separator 33 outputs the red light RLs is shifted in the direction +Y from the position via which the second color separator 33 outputs the green light GLs.

In each of the embodiments described above, p-polarized light corresponds to the first polarization component, and s-polarized light corresponds to the second polarization component. Specifically, the first polarization separator 22 transmits the p-polarized blue light BLp, which is the first polarization component, and reflects the s-polarized blue light BLs, which is the second polarization component. The second polarization separator 23 reflects the p-polarized blue light BLp, which is the first polarization component, and transmits the p-polarized yellow light YLs, which is the first polarization component. The configuration described above is not necessarily employed, and s-polarized light may be the first polarization component, and p-polarized light may be the second polarization component. In this case, for example, the first polarization separator 22 may reflect the p-polarized blue light BLp, which is the second polarization component, transmit the s-polarized blue light BLs, which is the first polarization component, and reflect the s-polarized yellow light YLs, which is the second polarization component. The second polarization separator 23 may reflect the s-polarized blue light BLs, which is the first polarization component, reflect the s-polarized yellow light YLs, which is the first polarization component, and transmit the p-polarized yellow light YLp, which is the second polarization component. That is, the second polarization separator 23 may be a polarization separator that reflects s-polarized light, which is the first polarization component, and transmits p-polarized light, which is the second polarization component.

In each of the embodiments described above, the light source apparatuses 2 and 2A each include the first light collector 25 and the second light collector 27, but not necessarily. At least one of the first light collector 25 and the second light collector 27 may be omitted.

In each of the embodiments described above, the light source section 21 outputs the blue light BLs and BLp in the direction +X, but not necessarily. The light sources 211 may output the blue light BLs and BLp in a direction that intersects the direction +X, and a reflection member may be so provided as to reflect the blue light BLs and BLp in such a way that the blue light is incident on the first polarization separator 22 in the direction +X.

In each of the embodiments described above, the projector includes the homogenizer 4 including the multi-lenses 41 and 42 and the superimposing lens 43, but not necessarily, and the homogenizer 4 may be omitted. In this case, a homogenizer having another configuration may be provided.

In each of the embodiments described above, the light source apparatuses 2 and 2A each output color light fluxes via four light exiting positions, and the liquid crystal panel 61, which forms the light modulator 6, has the pixels PX, which each have four sub-pixels SX, but not necessarily. In this case, for example, a total reflection member may be provided in the optical path of the yellow light YLs.

In the first embodiment described above, the light source apparatus 2 outputs the blue light BLs, the yellow light YLs, the green light GLs, and the red light RLs that are each s-polarized light and are spatially separate from one another.

In the second embodiment described above, the light source apparatus 2A outputs the blue light BLs, the green light GLs, and the red light RLs that are each s-polarized light and are spatially separate from one another. The configuration described above is, however, not necessarily employed, and the color light fluxes outputted from each of the light source apparatuses may each have another polarization state. For example, the light source apparatuses may each output a plurality of color light fluxes that are each p-polarized light and are spatially separate from one another. Further, the color light fluxes outputted from each of the light source apparatuses are not limited to blue light, yellow light, green light, and red light and may instead be other color light fluxes. For example, the light source apparatuses may each output white light in place of the blue light and the yellow light.

What is claimed is:

1. A light source apparatus comprising:
   a light source that outputs first light;
   a first polarization separator that transmits a first polarization component of the first light outputted from the light source in the first direction, and reflects a second polarization component of the first light outputted from the light source in a second direction perpendicular to the first direction;
   a second polarization separator that is located in the first direction with respect to the first polarization separator, and reflects the first polarization component of the first light outputted from the first polarization separator in the second direction;
   a first reflector that is located in the second direction with respect to the first polarization separator, and reflects the first light incident on the first reflector in a third direction opposite the second direction;
   a first retarder that is located between the first polarization separator and the first reflector in the second direction, and converts polarization components of the first light;
   a wavelength converter that is located in the second direction with respect to the second polarization separator, converts the first polarization component of the first light into second light, and outputs the second light in the third direction opposite the second direction;
   a first color separator that is located in the third direction with respect to the first polarization separator, and separates an incident light including the first light and the second light from the first polarization separator into third light and fourth light;
   a second retarder that is located in an optical path of the third light, and converts a polarization component of the third light;
   a third retarder that is located in the third direction with respect to the second polarization separator and converts polarization components of the second light; and
   a second color separator that is located in the third direction with respect to the third phase retarder, and separates the second light into fifth light and sixth light,
   wherein the second light outputted from the wavelength converter enters the second polarization separator,
   the second polarization separator transmits a first polarization component of the second light in the third direction, and reflects a second polarization component of the second light in a fourth direction opposite the first direction,
   the first polarization separator transmits the first polarization component of the first light outputted from the first retarder in the third direction and reflects the second polarization component of the second light reflected by the second polarization separator in the third direction.

2. The light source apparatus according to claim 1, further comprising a fourth retarder that converts part of the second polarization component of the first light outputted from the light source into the first polarization component of the first light.

3. The light source apparatus according to claim 2, further comprising a rotator that rotates the fourth retarder around an axis of rotation along the first direction.

4. The light source apparatus according to claim 1, further comprising a second reflector that is located in an optical path of the fourth light, and reflects part of the fourth light toward the first color separator.

5. The light source apparatus according to claim 1, further comprising a third color separator that is located in an optical path of the fourth light, transmits light that belongs to substantially a same wavelength band to which the fifth light belongs out of the incident fourth light, and reflects light that belongs to substantially a same wavelength band to which the sixth light belongs out of the incident fourth light toward the first color separator.

6. The light source apparatus according to claim 1, further comprising a first collector that is located between the first retarder and the first reflector, and collects the first light incident from the first retarder on the first reflector.

7. The light source apparatus according to claim 1, further comprising a second collector that is located between the second polarization separator and the wavelength converter, and collects the first light incident from the second polarization separator on the wavelength converter.

8. The light source apparatus according to claim 1, wherein the third light is outputted from a first position of the light source apparatus,
   the fourth light is outputted from a second position of the light source apparatus,
   the fifth light is outputted from a third position of the light source apparatus,
   the sixth light is outputted from a fourth position of the light source apparatus, and
   the first position of the light source apparatus, the second position of the light source apparatus, the third position of the light source apparatus, and the fourth position of the light source apparatus are different from each other.

9. A projector comprising:
   the light source apparatus according to claim 1;
   a light modulator that modulates light outputted from the light source apparatus; and
   a projection optical apparatus that projects the light modulated by the light modulator.

10. A projector comprising:
    the light source apparatus according to claim 2;
    a light modulator that modulates light outputted from the light source apparatus; and
    a projection optical apparatus that projects the light modulated by the light modulator.

11. A projector comprising:
    the light source apparatus according to claim 3;
    a light modulator that modulates light outputted from the light source apparatus; and
    a projection optical apparatus that projects the light modulated by the light modulator.

12. A projector comprising:
    the light source apparatus according to claim 4;

a light modulator that modulates light outputted from the light source apparatus; and
a projection optical apparatus that projects the light modulated by the light modulator.

13. A projector comprising:
the light source apparatus according to claim 5;
a light modulator that modulates light outputted from the light source apparatus; and
a projection optical apparatus that projects the light modulated by the light modulator.

14. A projector comprising:
the light source apparatus according to claim 6;
a light modulator that modulates light outputted from the light source apparatus; and
a projection optical apparatus that projects the light modulated by the light modulator.

15. A projector comprising:
the light source apparatus according to claim 7;
a light modulator that modulates light outputted from the light source apparatus; and
a projection optical apparatus that projects the light modulated by the light modulator.

16. The projector according to claim 9,
further comprising a homogenizer located between the light source apparatus and the light modulator,
wherein the homogenizer includes
two multi-lenses that divide the light outputted from the light source apparatus into a plurality of sub-light fluxes, and
a superimposing lens that superimposes the plurality of sub-light fluxes incident from the two multi-lenses on one another at the light modulator.

17. The projector according to claim 16,
wherein the third light is incident on a first position of the homogenizer,
the fourth light is incident on a second position of the homogenizer,
the fifth light is incident on a third position of light source apparatus,
the sixth light is incident on a fourth position of the homogenizer, and
the first position of the homogenizer, the second position of the homogenizer, the third position of the homogenizer, and the fourth position of the homogenizer are different from each other.

18. The projector according to claim 9,
wherein the light modulator includes
a liquid crystal panel having a plurality of pixels, and
a microlens array located on a light incident side of the liquid crystal panel and including a plurality of microlenses corresponding to the plurality of pixels,
the plurality of pixels each have a first sub-pixel, a second sub-pixel, a third sub-pixel, and a fourth sub-pixel, and
the plurality of microlenses each cause
the third light to be incident on the first sub-pixel,
the fourth light to be incident on the second sub-pixel,
the fifth light to be incident on the third sub-pixel, and
the sixth light to be incident on the fourth sub-pixel.

19. A light source module comprising:
a light source section that outputs first light;
a first polarization separator that, transmits a first polarization component of the first light outputted from the light source in the first direction, and reflects a second polarization component of the first light outputted from the light source in a second direction perpendicular to the first direction;
a second polarization separator that is located in the first direction with respect to the first polarization separator, and reflects the first polarization component of the first light outputted from the first polarization separator in the second direction;
a first reflector located in the second direction with respect to the first polarization separator, and reflects the first light incident on the first reflector in a third direction opposite the second direction;
a first retarder that is located between the first polarization separator and the first reflector in the second direction and converts polarization components of the first light; and
a wavelength converter that is located in the second direction with respect to the second polarization separator, and converts the first polarization component of the first light into second light, and outputs the second light in the third direction,
wherein the second light outputted from the wavelength converter enters the second polarization separator,
the second polarization separator transmits a first polarization component of the second light in the third direction, and reflects a second polarization component of the second light in a fourth direction opposite the first direction, and
the first polarization separator transmits the first polarization component of the first light outputted from the first retarder in the third direction, and reflects the second polarization component of the second light reflected by the second polarization separator in the third direction.

20. A light source apparatus comprising:
a light source that outputs first light;
a first polarization separator that transmits a first polarization component of the first light, reflects a second polarization component of the first light, and reflects a second polarization component of second light;
a second polarization separator that reflects the first polarization component of the first light, transmits a first polarization component of the second light, and reflects the second polarization component of the second light;
a first reflector that reflects the first light;
a wavelength converter that converts the first light into the second light;
a first color separator that separates an incident light including the first light and the second light into third light and fourth light;
a second color separator separates the second light into fifth light and sixth light
a first retarder that converts polarization components of the first light;
a second retarder that converts polarization components of the second light; and
a third retarder that converts a polarization component of the third light.

\* \* \* \* \*